United States Patent Office 3,410,343
Patented Nov. 12, 1968

3,410,343
WATERFLOOD EMPLOYING A VISCOELASTIC, SHEAR-HARDENING, POSITIVE NONSIMPLE LIQUID WITH STABILIZING AGENT
Milton K. Abdo, Dallas, Tex., assignor to Mobil Oil Corporation, a corporation of New York
No Drawing. Filed June 7, 1967, Ser. No. 644,108
51 Claims. (Cl. 166—9)

ABSTRACT OF THE DISCLOSURE

This specification discloses a method of recovering oil from a subterranean formation employing flooding water containing a concentration of a soap system at least sufficient to induce the properties of viscoelasticity, positive nonsimplicity, and sheer hardening thereto and containing a stabilizing agent. The soap systems are one or more of three basic systems: (a) alkali metal soaps with a strong electrolyte, (b) ammonium soaps with an electrolyte, and (c) substituted ammonium soaps. By soap is meant the caustic neutralized product of a fatty acid containing from 12 to 18 carbon atoms, inclusive. The stabilizing agent is sparingly soluble in water and preferentially soluble in hydrocarbons. It is preferably an alcohol containing from 5 to 13 carbon atoms, inclusive, or an aromatic hydrocarbon such as benezene or toluene. Further, both an alcohol and an aromatic hydrocarbon may be employed as the stabilizing agent.

BACKGROUND OF THE INVENTION

Field of the invention

This invention pertains to a method of recovering petroleum from a subterranean formation. More specifically, this invention pertains to a method of recovering petroleum from a subterranean formation by flowing into the formation an aqueous flooding liquid containing additives.

Description of the prior art

The petroleum, more commonly called crude oil or simply oil, accumulated in subterranean formations is recovered or produced therefrom through wells completed in the subterranean formation. A large amount of the oil is left in the formation if produced only by primary depletion, that is, where only initial formation energy is used to recover the oil. Where the initial formation energy is inadequate or has become depleted, supplemental operations, often referred to as secondary recovery operations, are employed. In the most successful and most widely used of these operations, a fluid is injected through injection means, comprising one or more wells, and passed into the formation. Oil is displaced within and is moved through the formation, and is produced from production means, comprising one or more wells, as the injected fluid passes from the injection means toward the production means. In a particular recovery operation of this sort, water is employed as the injected fluid and the operation is referred to as a waterflood. The injected water is referred to as the flooding water, as distinguished from the in situ, or connate, water.

Waterflooding is a very useful method of recovering oil from a subterranean formation. There are, however, two major problems which reduce its effectiveness. The first problem is the premature production of the flooding water at the production means before an adequate amount of oil has been produced from the formation. This premature production of the flooding water is referred to as premature breakthrough and is reflected as an increasing ratio of the amount of flooding water to the amount of oil in the produced fluids. The degree of prematurity of the breakthrough of the water is influenced by two major factors. The first of these factors is the permeability stratification of the subterranean formation. The second of these factors is the difference is viscosity between that of the in situ oil and the flooding water.

Permeability stratification within the subterranean formation causes a disproportionately large amount of the flooding water to enter the more permeable strata. Consequently, the oil is displaced within and flows through the more permeable strata and the flooding water advances therethrough much more rapidly than through the less permeable strata. Thus, there occurs a flow profile which is nonuniform in vertical cross section. The flooding water breaks through at the production well in the more permeable strata.

An unfavorable difference in viscosity between the in situ oil and that of the flooding water creates a situation referred to as instability. Instability exists when the viscosity of the flooding water is less than that of the in situ oil. The less-viscous flooding water tends to develop fingers, or bulges, which may be caused by a point of minute inhomogeneity in the formation. These fingers grow and travel at a much faster rate than the remainder of the injected fluid. Thus, instability can cause premature breakthrough in either vertical cross section or horizontal cross section. The result is a nonunion flow profile; ordinarily, in both the vertical and horizontal cross section.

The second problem is the relatively poor microscopic displacement of oil which is effected by the flooding water. The relatively poor microscopic displacement is caused by relatively high interfacial tension and unfavorable contact angles between the flooding water and in situ oil.

Various means have been proposed to avoid premature breakthrough. Selective plugging operations have been described to correct premeability stratification. Viscosity gradation, wherein an intermediate fluid or fluids having a viscosity between that of the flooding water and the in situ oil is employed, has been described to cure or minimize instability fingering. Specifically, addition of thickening agents to a portion of the flooding water has been described to improve the mobility ratio and help correct instability fingering.

To improve the microscopic displacement of oil by the flooding water, it has been suggested that a surfactant be added to the flooding water to decrease the interfacial tension and to alter favorably the contact angle.

U.S. Patent 2,341,500, Process of Recovering Oil from Oil Sands, issued Feb. 8, 1944, to Kenneth D. Detling, described employing a thickener for more nearly matching the viscosity of the flooding water and the in situ oil. One of the thickening agents proposed was a soap and a hydroxy aromatic compound such as phenol. Such thickened flooding water does not correct for permeability stratification of the subterranean formation as does applicant's invention. Other patents, such as U.S. 2,808,109, Water Flooding Compositions, issued Oct. 1, 1957, to James C. Kirk, describe the addition of a petroleum sulfonate and a low molecular weight alcohol such as an alcohol having 1 to 4 carbon atoms in the flooding water. In this patent, the alcohol is employed as a hydrotrope to increase the solubility in water of petroleum sulfonate that is predominantly oil soluble. Again, this patent does not enable alleviating the adverse effects of permeability stratification or help create a more nearly uniform flow profile of the flooding water.

The inventor has a copending application, U.S. Ser. No. 351,936, filed Mar. 16, 1964, describing employing shear hardening, positive nonsimple liquids formed by incorporating soap systems into flooding water for achieving more nearly uniform injection and flow profiles. The liquids were called "active" because of their unusual rheological behavior. It has been found that, after a period of time in intimate contact with oil in simulated subterranean formations, the soap system, particularly the soap employed, repartitions itself; part going over into the oil phase and lowering the effective concentration in the leading edge of the active flooding water. Often this destroys the activity in the leading edge of the flooding water containing the soap system.

SUMMARY OF THE INVENTION

The invention is an improvement in a method of recovering oil from a subterranean formation having injection means and production means completed therein, in which a fluid is injected through the injection means and into the formation, and oil is produced from the formation through the production means to the surface of the earth. The improvement comprises injecting a slug of flooding water (1) containing a quantity sufficient to convert the flooding water to a viscoelastic shear hardening, positive nonsimple liquid of a soap system of either: (a) an alkali metal soap of a fatty acid and a strong electrolyte, (b) an ammonium soap of a fatty acid and an electrolyte, or (c) a substituted ammonium soap of a fatty acid; the fatty acid containing from 12 to 18 carbon atoms, inclusive; (2) having a pH greater than 7.0; and (3) containing at least 0.001 percent by weight and no more than saturation concentration of a stabilizing agent sparingly soluble in water and preferentially soluble in hydrocarbons, being one or both of either an alcohol containing 5 to 13 carbon atoms inclusive, or an aromatic hydrocarbon.

The flooding water that is a viscoelastic, shear hardening, positive nonsimple liquid will be hereinafter termed "active" and the rheological properties termed "activity," according with usage in the mentioned application Ser. No. 351,936.

DESCRIPTION OF SPECIFIC EMBODIMENTS

Waterflooding is well known, therefore a detailed description of the known steps involved is believed unnecessary. The steps are described or inferred in such well-known references as Primer of Oil and Gas Production, American Petroleum Institute, Division of Production, Dallas, Tex., published by American Petroleum Institute, New York, N.Y. (1954), and Petroleum Production Engineering, Oil Field Exploitation, L. C. Uren, Third Edition, McGraw-Hill Book Company, Inc. (1953). Conventional mixing equipment, storage tanks, pumps, and piping are employed in incorporating the soap system and stabilizing agent into the flooding water, and injecting the resulting mixture into the injection means. Conventional production equipment such as water knockouts, oil and gas separators, emulsion breaking equipment, storage tanks, pipeline, and pumping equipment is employed in producing the oil.

A review of the rheological properties exhibited by the active solutions and method of testing therefor are given before discussing the materials themselves.

A viscoelastic liquid is a liquid which possesses both elastic and viscous properties. Viscoelastic liquids have a characteristic viscosity function, which function may or may not be dependent on rate of shear or stress. They also exhibit elasticity of shape and a retarded elastic recovery in deformation. A viscoelastic liquid may be a solution comprising one or more solvents containing one or more solutes. The term "solution" is employed herein in connection with the active liquids of the invention to encompass all aqueous dispersions which do not deposit a filter cake when injected into the formation.

In laminar flow of a viscoelastic liquid, components of stress which are normal as well as tangential to the direction of the stress frequently develop and secondary flow effects appear. Thus, the normal stresses in a viscoelastic liquid flowing in a circular conduit cause an appreciable axial tension to develop. When the flowing liquid emerges from a circular conduit, the tension in the streamlines relaxes, with the result that the liquid stream swells to a diameter in excess of the diameter of the conduit. Accordingly, the liquid leaving the conduit expands or bulges outwardly, forming what might be termed an enlarged bulb at the opening of the conduit.

Another characteristic of a viscoelastic liquid is its flow behavior between rotating concentric cylinders. Analysis of the complete spatial distribution of stress for a viscoelastic liquid in this situation shows that the primary phenomenon is the appearance of an additional tension along the streamlines. Between the rotating concentric cylinders, the streamlines are circles and the tension becomes a hoop or strangulation stress which constricts the liquid toward the axis of rotation. As a consequence, the liquid tends to climb the rotating cylinder and a pronounced thrust develops.

Further with respect to the characteristics of a viscoelastic liquid, it can be shown by theoretical analysis that flow in rectilinear paths through conduits of arbitrary cross section under a constant pressure gradient is not always possible for certain of these liquids. Thus, if the flow conduit is noncylindrical, superimposed onto the simple rectilinear motion is a steady motion in which liquid particles follow spiral paths to develop a vortexlike motion.

Each of the properties of a viscoelastic liquid described above is of value in displacing oil from a subterranean formation. Flow of the liquid through the interstices of a subterranean formation will ordinarily be laminar. Thus, with the development of axial tension of the viscoelastic liquid upon flow from restraining portions of substantially circular interstices, or conduits, within the formation, the resulting bulging effect enables the viscoelastic liquid to displace the oil from adjacent wider portions of the interstices. The development of tension along the streamlines of flow of the viscoelastic liquid and the development of thrust by the liquid will additionally effect displacement of the oil otherwise trapped within the interstices of the formation. Furthermore, the development of vortexlike motion in the flow of the viscoelastic liquid in noncircular interstices effects a thorough displacing action by the viscoelastic liquid of the oil in the interstices.

As the name implies, a shear hardening liquid is a liquid which hardens, i.e., develops a higher viscosity, when subjected to certain rates of shear. The property of shear hardening thus enables such a liquid to develop a higher viscosity when subjected to a higher rate of shear in a subterranean formation. Such a higher rate of shear is induced in a liquid when it flows in a more permeable stratum than when it flows in parallel, i.e., under the influence of the same pressure drop, in a less permeable stratum within a subterranean formation. A shear hardening liquid thus is active in that it becomes selectively more viscous in the more permeable strata than in the less permeable strata. As a result, the rates of flow of the liquid in the more permeable and in the less permeable strata become more nearly equalized and premature breakthrough is lessened.

A positive nonsimple liquid is a liquid which has a higher viscosity when it flows in a more permeable stratum than when it flows at the same nominal rate of shear in a less permeable stratum. A positive nonsimple liquid thus is active in the sense that it adjusts its properties to flow at a rate which is relatively insensitive to the permeability of the various strata within a subterranean formation through which it is flowing. This phenomenon differs from that of shear hardening in that the positive nonsimple liquid increases in viscosity in the more permeable strata through which it is flowing even at equal rates of shear. Permeability controls whether a flowing positive nonsimple liquid becomes more viscous or not, whereas shear rate controls whether a flowing shear hardening liquid becomes more viscous or not. Both phenomena operate to achieve more nearly uniform injection and flow profiles of a positive nonsimple, shear hardening liquid passing through a subterranean formation.

The active solutions employed in the method of the invention exhibit the properties of shear hardening, positive nonsimplicity, and viscoelasticity. Through the properties of shear hardening and positive nonsimplicity, they improve the macroscopic sweep efficiency and thus enable the recovery of a greater portion of the oil from a subterranean formation before they break through at a production well. Since the active solutions are also viscoelastic, they improve the microscopic flooding efficiency as they pass through the subterranean formation.

Whether a particular liquid exhibits the properties of shear hardening, viscoelasticity, or positive nonsimplicity can be determined from its behavior in a rotational viscometer, such as a Couette-type viscometer. The viscosity of the liquid, measured as a function of the rate of shear on such a rotational viscometer at different gap sizes, indicates the existence of each of the properties. The gap size in such a viscometer is the distance separating the concentric cylinder walls immersed in the liquid whose viscosity is being measured. The curve which results from plotting the data obtained on the viscometer, e.g., plotting the viscosity as the ordinate against the shear rate as the abscissa, depicts the properties of shear hardening, viscoelasticity, or positive nonsimplicity. With a solution, if the curve representing the viscosity of the solution increases with increasing shear rates within a certain range of shear rates, the solution is a shear hardening liquid. If a liquid exhibits the previously described properties, e.g., (1) upon emergence from a conduit swelling to a diameter in excess of the diameter of the conduit, or (2) climbing a cylinder rotating therein, it is viscoelastic. Further tests for determining whether a liquid is viscoelastic or not may be found in a number of published books discussing the phenomenon, e.g., Viscoelastic Properties of Polymers, J. D. Ferry, Wiley Publishing Co., New York, 1961. If the curve representing the viscosity of the solution is higher than that of the solvent at certain shear rates using a particular gap size on the viscometer and is higher still at the same shear rates using a larger gap size, the solution is a positive nonsimple liquid. Further, with solutions exhibiting the properties of shear hardening, viscoelasticity, and positive nonsimplicity, the relative quantitative activity of the solution may be measured by the area between the curve representing the viscosity response of the solvent and the curve representing the viscosity response of the solution at an arbitrarily chosen gap size. One useful gap size is 0.123 centimeter between concentric cylinders having radii of 1.257 and 1.380 on a U.L. adapter of a Brookfield Model LVT Synchro-Lectric Viscometer having variable rate of rotation.

The properties of shear hardening, viscoelasticity, and positive nonsimplicity also can be determined by flowing a liquid through models or core samples of subterranean formations having different permeabilities. Such models may be connected in parallel to simulate strata of differing permeabilities in a subterranean formation. In these models, apparent viscosity can be measured as a function of shear rate. Such determinations carried out in the models or core samples are time consuming and the use of a rotational viscometer is preferred to delineate liquids having the properties of shear hardening, viscoelasticity, and positive nonsimplicity.

Each of the specific soap systems employed to convert the flooding water to an active solution requires as one constituent at least one of the soaps of a fatty acid which, as noted before, contains 12 to 18 carbon atoms, inclusive. Suitable fatty acids from which the soaps can be prepared are described at page 484 of The Condensed Chemical Dictionary, Sixth Edition, edited by Arthur and Elizabeth Rose, Reinhold Publishing Corporation, New York, 1961. Illustrative of the fatty acids are lauric acid, myristic acid, palmitic acid, stearic acid, elaidic acid, and oleic acid. It is not necessary to use purified fatty acid in preparing the soap for use in the flooding water since the commercial grade crude fatty acid reacts to form a soap which is effective in preparing the viscoelastic, shear hardening, positive nonsimple flooding water.

The nature of the flooding water available in a given oil field will generally govern which cation of the soap is chosen to prepare the active flooding water. For example, if the flooding water contains a strong electrolyte, such as sodium chloride, in a concentration above about 3 percent by weight, it will generally be advantageous to employ an alkali metal soap. An alkali metal soap is readily prepared by neutralizing the selected fatty acid with an alkali metal base such as the alkali metal hydroxides. The soaps thus produced may be, for example, alkali metal saturated soaps such as alkali metal laurate, alkali metal myristate, alkali metal palmitate, and alkali metal stearate; or alkali metal unsaturated soaps such as alkali metal elaidate and alkali metal oleate. One of the most economical soaps is sodium oleate. The alkali metal soaps require the presence of a strong electrolyte to form active solutions.

As another example, if the flooding water contains less than 3 percent by weight of strong electrolyte or contains a weak electrolyte, it may be desirable to employ an ammonium soap. The ammonium soap is formed by neutralizing the selected fatty acid with ammonium hydroxide. The ammonium soaps thus produced may be, for example, ammonium saturated soaps such as ammonium laurate, ammonium myristate, ammonium palmitate, and ammonium stearate; or the ammonium unsaturated soaps such as ammonium elaidate and ammonium oleate. A relatively plentiful soap is ammonium oleate. The ammonium soaps require the presence of some electrolyte, weak or strong, to form active solutions.

As a further example, if the flooding water contains no electrolyte, it may be advantageous to employ a substituted ammonium soap and effect the advantages attending employing comparatively fresh water to displace oil from the subterranean formation. The substituted ammonium soap is prepared by neutralizing the selected fatty acid with a substituted ammonium base. The substituted ammonium soaps thus produced may be, for example, the substituted ammonium saturated soaps such as substituted ammonium laurate, substituted ammonium myristate, substituted ammonium palmitate, and substituted ammonium stearate; or the substituted ammonium unsaturated soaps such as substituted ammonium elaidate and substituted ammonium oleate. An easily prepared substituted ammonium soap is sec-butylamine oleate. Illustrative of such substituted ammonium bases are methylamine; ethylamine; higher amines, such as sec-butylamine; or the alkanolamines, such as ethanolamine. The substituted ammonium soaps do not require the presence of either a weak electrolyte or a strong electrolyte to create active solutions when added to water. However, aqueous solutions of the substituted ammonium soaps form active solutions in the presence of either weak or strong electrolytes in limited concentrations as discussed hereinafter.

Two or more compatible active solutions, or two or more compatible soap systems to provide an active solution, may be combined to tailor the activity to the conditions in the subterranean formation.

The reaction to prepare the soap may be carried out by adding the appropriate amount of the fatty acid and at least an equimolar amount of the base directly to the flooding water to form the active flooding water. Alternatively, the soap may be prepared by reacting the fatty acid with the base, and the finished soap then added to the flooding water to prepare the active solution.

Strong electrolytes are discussed and their requirements set forth at page 506 of Outlines of Physical Chemistry, Farrington Daniels, John Wiley and Sons, Inc., New York, 1948. Water-soluble inorganic salts are illustrative of strong electrolytes and form the preferred strong electrolytes to be employed in the soap system. Common examples include inorganic salts such as sodium chloride, sodium carbonate, potassium chloride, and potassium carbonate. Mixtures of inorganic salts also may be employed as the strong electrolyte.

Weak electrolytes, on the other hand, are those materials which have a much lower degree of ionization than do the strong electrolytes when dissolved in an aqueous solution. Examples of weak electrolytes are ammonia and its derivative compounds, such as ammonium hydroxide and ethylamine hydrochloride.

The stabilizing agents are sparingly soluble in water. They are soluble in the flooding water containing the soap system, at about 25° C., in an amount of from about 0.001 to about 0.7 percent by weight in the flooding water containing the soap system. In this connection, the soap in the flooding water acts as a hydrotrope to increase the solubility of the stabilizing agent.

The preferred alcohol stabilizing agents are those containing from 6 to 9 carbon atoms, inclusive. The most preferred alcohols are those containing 8 carbon atoms. Illustrative of the most preferred alcohols is 2-ethylhexanol. Two or more alcohols can be employed together. Illustrative of the aromatic hydrocarbon stabilizing agents that can be employed are benzene, toluene, and xylene. Of these aromatic hydrocarbons, the benzene and toluene are preferred. Similarly to the alcohols, two or more of the aromatic hydrocarbons may be employed together.

Particularly effective results are obtained by employing flooding water containing the soap system and containing both an alcohol and an aromatic hydrocarbon as stabilizing agent. Two or more alcohols and two or more aromatics can be employed together. It appears that there is an interrelationship between the soap, the alcohol, and the aromatic compound which enhances the effect of each, achieving a wider region of mutual miscibility between the oil, the stabilizing agents, and the soap micelles which effects more nearly complete microscopic displacement of the oil, improves the injection and flow profiles, alleviates the adverse effects of instability, of permeability stratification, and of soap repartitioning into the oil, and increases the amount of oil ultimately recoverable. For example, a slug of flooding water containing the soap system, 2-ethylhexanol and benzene is particularly effective in recovering oil.

The flooding water to which the soap system and stabilizing agent will be added should contain no more than 100 parts per million (p.p.m.) of divalent ions, such as calcium ions or magnesium ions. Preferably, it should contain less than about 20 to 50 p.p.m. In those instances where the formation brines or the flooding water available in a field contains concentrations of divalent ions above 100 p.p.m., steps should be taken to reduce this concentration. Suitable steps include dilution of the brine with fresh water, precipitating the divalent ions by incorporating suitable additives such as sodium carbonate and lime into the brine, or ion exchanging with suitable zeolite softeners.

Once the particular soap has been selected for a given application, the degree of activity shown by the flooding water containing the soap is most directly determined by the concentration of the soap additive in the viscoelastic solution. The concentration of the soap required, however, is inversely related to the concentration of the electrolyte and is directly related to the temperature and the shear stress, explained hereinafter. The best concentration of soap may be determined empirically by testing the relative viscoelasticity, the shear hardening behavior, or the positive nonsimplicity of different concentrations of soap in the particular flooding water at the temperature of the subterranean formation. Various pH's may be employed in the flooding water as a part of the empirical determination. The following guidelines have been found useful in creating active flooding water which is effective in forming more nearly uniform injection and flow profiles and in displacing oil within the subterranean formation.

A concentration of at least 0.001 percent by weight of a saturated fatty acid soap must be employed in the aqueous solution to achieve any appreciable activity. In general, a concentration of at least 0.01 percent by weight of soap, whether of a saturated or unsaturated fatty acid, should be employed to afford sufficient activity in the flooding water to be effective in recovering additional oil. It is preferred that at least 0.05 percent by weight of the alkali metal or ammonium unsaturated soaps, such as the alkali metal oleates or ammonium oleate, be employed.

Often, no more than 0.1 percent by weight of saturated soaps need be employed to obtain adequate activity. In general, a concentration of no more than 1 percent by weight of any soap need be employed and ordinarily further increases in concentration are not economically advisable. However, an amount of soap sufficient to effect coacervation, a condition analogous to supersaturation and evidenced by opalescence as visible micelles form, in the aqueous solution may also be employed. Infrequently, it may be desirable to employ a concentration as high as 5 percent for specialized applications where (a) the flooding water is to be flowed at temperatures near the boiling point thereof, or (b) a particularly permeable stratum is to have mobility restricted therein.

As previously indicated, the flooding water and the formation will often determine whether or not electrolyte is to be employed in the flooding water with the soap and, if so, the type and concentration to be employed. The following guidelines have been found useful with regard to either selecting the particular soap system or improving the performance thereof in view of the concentration of the electrolyte constituent. The substituted ammonium soaps are employed in a solution containing no electrolyte or containing a concentration up to about 3 percent by weight of either a weak electrolyte or a strong electrolyte. On the other hand, the ammonium soaps require in the aqueous solution a concentration of at least 0.05 percent by weight of electrolyte to be active. They remain active through concentrations as high as about 7.5 percent by weight of electrolyte. The alkali metal soaps, such as the sodium or potassium soaps, require in the flooding water at least about 0.4 percent by weight, or more, of electrolyte to be active. They remain active at concentrations as high as about 14 percent by weight, or more, of electrolyte. As with the concentrations of soap, higher concentrations of electrolyte within the foregoing limits shift a region in which activity is achieved to higher temperatures and higher shear stresses.

Controlling the pH on the alkaline side, that is, greater than 7, increases the activity of the flooding water containing the soap system. Preferably, a pH greater than 9 and less than about 12 is employed. The pH at which the solutions are most active and hence most effective in effecting more nearly uniform flow profiles is around 10.5.

The alkali metal soaps, the ammonium soaps, and the substituted ammonium soaps, often referred to as the amine soaps, form alkaline solutions in neutral water. The pH of the viscoelastic soap solution is controlled better, however, by adding caustic where necessary rather than by adding extra quantities of soap. Caustic includes alkali metal hydroxides or alkali metal carbonates. Suitable caustic also includes ammonium hydroxide, although it causes a nondetrimental ion exchange reaction. An alkali metal carbonate is particularly useful since it tends to afford a buffered pH in the desired range even when used in excess of the required amount.

Ammonium chloride can be employed to improve the long-term activity of the ammonium soap and weak electrolyte in the flooding water. The amount of ammonium chloride incorporated into the aqueous solution of ammonium soap and weak electrolyte is at least 0.05 percent by weight of the flooding water. No more ammonium chloride than 0.5 percent by weight of the solution is required.

Also, a mixed amine-acid compound can be employed to improve the long-term activity of the substituted ammonium soaps in the flooding water. Illustrative of such mixed amine-acid compound is ethylamine hydrochloride. The amount of the mixed amine-acid compound incorporated into the flooding water containing the substituted ammonium soap is at least 0.05 percent by weight of the flooding water. No more mixed amine-acid compound than 0.5 percent by weight of the flooding water is required.

To be effective in stabilizing the flooding water containing the soap system and preventing the partitioning of the soap over into the oil, the stabilizing agent must be present in a concentration of at least 0.001 percent by weight of the flooding water. However, the stabilizing agent should not be present in a concentration greater than the saturation concentration at the temperature of the subterranean formation. Stated otherwise, the stabilizing agent should not be used in an amount greater than will dissolve in the flooding water containing the soap system. For example, in subterranean formations having a temperature of about 25° C., the concentration of stabilizing agent will be no more than about 0.7 percent by weight when the saturation concentration is about 0.7 percent by weight.

The concentration of stabilizing agent may be adjusted to effect an additional degree of control over the activity of the flooding water. I have found that there is a critical concentration of stabilizing agent below which the active flooding water remains active but above which activity is temporarily destroyed. With the stabilizing agents I have investigated, this critical concentration appears to be about 0.07 percent by weight. It may vary somewhat depending on the stabilizing agent employed. Thus, when a concentration less than the critical concentration, e.g., less than about 0.07 percent by weight, of the stabilizing agent is added to the active flooding water, the active flooding water continues to respond to shear stress effects and to exhibit positive nonsimple behavior to become selectively more viscous in a more permeable stratum within the subterranean formation than in a less permeable stratum. This is advantageous in most instances.

On the other hand, in formations having restricted permeabilities, it is desirable to achieve the maximum rate of injection through the injection means and into the subterranean formation. In such cases, it is desirable to delay the onset of activity in the flooding water until it has reached some distance, for example, 10 to 50 feet, or more, from the injection well. This delay in onset of activity may be effected by incorporating a concentration of greater than the critical concentration, e.g., greater than about 0.07 percent by weight, of the stabilizing agent into the active flooding water. A concentration of stabilizing agent above the critical concentration temporarily destroys the activity and enables injection of the flooding water containing the soap system and stabilizing agent at high rates; and, consequently, at high rates of shear; without causing any adverse increase in viscosity because of shear hardening. As the flooding water containing the soap system and the stabilizing agent flows into the subterranean formation, however, the stabilizing agent begins to partition slowly into the oil. While the stabilizing agent is slowly partitioning into the oil, the soap system remains in the flooding water and does not partition into the oil. When the stabilizing agent concentration decreases to the critical concentration, activity is restored to the flooding water and the desirable viscoelastic, shear hardening, positive nonsimple behavior begins to be asserted with the advantageous achieving of a more nearly uniform injection and flow profile.

Where treated flooding water is injected into the formation, the particular soap system and stabilizing agent employed may be incorporated in only a portion of the flooding water to create a slug, or slugs, thereof. Each slug should have a volume of at least 0.1 percent but preferably at least 1 percent of the pore volume of the formation. Where only one slug is employed, it may have a volume of 0.1 to 20 percent of the pore volume of the formation. Where more than one slug is employed, the total volume of the slugs may be from 0.2 to 20 percent of the pore volume of the formation.

The slug of flooding water containing the soap system and the stabilizing agent is injected through the injection means and passed into the formation. It may be driven into the formation by injecting therebehind a driving fluid such as water or natural gas. Where multiple slugs of the treated flooding water are employed, a volume of driving fluid, preferably having the same volume as the slug of the treated flooding water, is injected between the slugs. In this latter case, it is preferred that the driving fluid be untreated flooding water, i.e., flooding water not containing soap system or stabilizing agent. Instead of untreated flooding water, flooding water containing a lower concentration of a soap system and hence less activity as a viscoelastic, shear hardening, positive nonsimple liquid, may be employed between alternate slugs of flooding water containing the soap system and the stabilizing agent.

It is possible to precipitate a divalent salt, such as the calcium salt of a fatty acid, if the treated flooding water employed comes in contact with aqueous formation liquids containing a relatively high concentration of divalent ions such as calcium ions. It is preferred to take steps to prevent such precipitation. One way to prevent such precipitation is to inject a slug of from about 0.01 to 10.0 percent or more of a pore volume of water in advance of the treated flooding water. The water will build up a bank and miscibly displace aqueous formation liquids containing the divalent ions, thus preventing contact of the treated flooding water with the aqueous formation liquids.

Another way to prevent such precipitation of calcium salt of a fatty acid is to incorporate into the flooding water containing the soap a chelating or sequestering agent, such as tetrasodium salt of ethylenediaminetetraacetic acid, or sodium phosphate glass. The tetrasodium salt of ethylenediaminetetraacetic acid is sold commercially as sodium Versenate. The sodium phosphate glass is commonly called sodium hexametaphosphate and sold commercially as Calgon. Other chelating or sequestering agents include the soluble phosphates such as sodium pyrophosphate. The amount of chelating agent should be at least 0.1 percent by weight. Ordinarily, the amount of chelating agent employed is less than about 1.5 percent by weight. On the other hand, with amounts of sodium chloride less than 1.0 percent by weight, greater amounts of chelating agent up to about 2.5 percent by weight may be employed. Alternatively, a slug of from 0.01 to 1 percent of a pore volume of an aqueous solution of the chelating or sequestering agent may be injected into the formation ahead of the treated flooding water.

If desired, both ways of preventing precipitation may be combined. Thus, a slug of water may be injected into the injection well and passed into the formation, followed by a slug of the chelating agent, prior to the treated flooding water.

In the event the driving fluid to be injected behind the flooding water containing the soap system and the stabilizing agent is aqueous and contains relatively high concentrations of divalent ions, a slug of water, a slug of chelating agent in solution, or both, should be injected between the flooding water containing the soap system and the stabilizing agent and the flooding water containing the relatively high concentration of divalent ions to prevent the formation of calcium soaps. Slug size and concentration of chelating agent should be the same as described hereinbefore.

The amount of oil recovered by the flooding operation carried out in accordance with the invention may be increased by injecting, immediately in advance of the flooding water containing the soap system and the stabilizing agent, a slug of from about 0.5 to 10 percent pore volume of either (a) stabilizing agent or (b) oil containing from 1 to 10 percent by weight of a stabilizing agent.

The following descriptive matter and examples are illustrative of the invention. In these examples, the laboratory models were constructed to simulate a subterranean formation. Yates sand of the Kermit Field, Winkler County, Tex., was employed in construction of the models. Yates sand contains about 5 percent dolomite and 16 percent other clay which is a regularly interstratified calcium-montmorillonite-chlorite mixture. The models had a diameter of 0.595 inch, a length of about 22 inches, a porosity of about 41.02 percent, a pore volume of about 41.1 cubic centimeters (cc.), and a specific permeability to a 1 percent sodium chloride solution of about 577 millidarcies (md.). The models were saturated with water. The water was, in turn, displaced by flowing Yates crude oil through the models until no more water was produced therefrom. The Yates crude oil had a viscosity of 4.4 centipoises. The initial oil saturation was 62.44 percent of the pore volume. To stimulate a waterflood, untreated flooding water was flowed through the models until no more oil was being produced. The final oil saturation at the end of the waterflood was 23.45 percent of the pore volume. Thus, the waterflood recovered about 62.4 percent of the original oil in place. This waterflood was employed as the standard against which to compare the results obtained thereafter. It is summarized as Run No. 1 in the table following the examples.

The treated flooding waters employed in the examples were not thick liquids but had a nominal viscosity of about 1.1 centipoises.

It was realized at the time the model was constructed that it did not have severe permeability stratification such as occurs in most subterranean formations and did not show the most advantageous effects of the active flooding water in alleviating adverse effects of this permeability stratification. It was believed, however, that if an improvement could be effected in this model the results in a subterranean formation would be even better.

Example 1

This example illustrates the increased recovery obtainable by incorporating an octanol into active flooding water.

A second run was performed on the Yates crude oil in one of the laboratory models. The model was saturated to an initial oil saturation of 66.67 percent with the Yates crude oil. The flooding water employed contained 0.2 percent by weight sodium oleate, 1.0 percent by weight sodium chloride, and 0.025 percent by weight 2-ethylhexanol. The flooding water also contained 0.22 percent by weight sodium Versenate and 0.035 percent by weight sodium hydroxide to prevent precipitation of a calcium soap and to afford a pH of 10.9. The flooding operation was carried out until no more oil was being produced. A total of 72.5 percent of the oil originally in place was recovered. This example is summarized as Run No. 2 in the table.

Example 2

This example illustrates the increased recovery obtainable by incorporating an octanol into an active flooding water in a concentration sufficient to render the system temporarily inactive. The flooding operation in this example was carried out, on one of the laboratory models, as nearly duplicating Example 1 as could be done with two exceptions. These exceptions were that the concentration of 2-ethylhexanol was increased to 0.075 percent by weight in the flooding water and the flooding water subjected to mild agitation in the presence of the crude oil before being injected. The flooding operation was carried out until no more oil was being produced. A total of 85.1 percent of the original oil in place was recovered. This example is tabulated as Run No. 3 in the table.

Example 3

This example illustrates still further improvement in oil recovery effected when a slug of oil containing an octanol is injected ahead of the flooding water containing a soap system and the octanol.

The flooding operation in this fourth run was carried out on one of the laboratory models as nearly the same as practical to that in Example 1 with the exception of one aspect. That aspect was the injection of a slug of 0.018 pore volume of 2-ethylhexanol injected ahead of the treated flooding water. Again, the flooding operation was continued until no more oil was being produced. A total of 95.2 percent of the original oil in place was recovered. This example is tabulated as Run No. 4 in the table.

Example 4

This example illustrates that an improved recovery of treated flooding water compared to flooding water alone can be effected by employing benzene instead of the 2-ethylhexanol as the stabilizing agent. In this example the flooding operation was carried out on one of the laboratory models as nearly the same as practical to that in Run 1 with one exception. That exception was that instead of employing 2-ethylhexanol as the stabilizing agent, 0.2 percent by weight of benzene was employed in the treated flooding water. Again, the flooding operation was continued until no more oil was being produced. A total of 80.0 percent of the original oil in place was recovered. This example is tabulated as Run No. 5 in the table.

Example 5

This example illustrates the improved recovery by employing flooding water containing a soap system and containing both an octanol and an aromatic hydrocarbon.

In this example the flooding operation was carried out as nearly the same as practical to that in Example 1, with the following exception. The flooding water contained both 0.05 percent by weight 2-ethylhexanol and 0.3 percent by weight benzene. The flooding operation was continued until no more oil was being produced. A total of 88.4 percent of the original oil in place was recovered. This example is tabulated as Run No. 6 in the table.

It was noted during this run that the inclusion of the benzene caused the interfacial tension with the oil to about double to a value of 0.214 dyne per centimeter.

The table shows the weight percent of sodium oleate (NaOl), sodium chloride (NaCl), 2-ethylhexanol, and benzene in the flooding water. For convenience in comparing results, it shows the oil recovery in percent of the original oil in place.

64.72 FP, TABLE.—WEIGHT PERCENT OF COMPONENTS IN FLOODING WATER

| Run | Ex. No. | NaOl | NaCl | 2-ethyl hexanol | Benzene | Oil Recovery (percent orig. oil in place) | Remarks |
|---|---|---|---|---|---|---|---|
| Number: 1 | | | | | | 62.4 | Waterflooding alone. |
| 2 | 1 | 0.2 | 1.0 | 0.025 | | 72.5 | |
| 3 | 2 | 0.2 | 1.0 | 0.075 | | 85.1 | |
| 4 | 3 | 0.2 | 1.0 | 0.025 | | 95.2 | 0.018 p.v. 2-ethylhexanol injected ahead of flooding water. |
| 5 | 4 | 0.2 | 1.0 | | 0.20 | 80.0 | |
| 6 | 5 | 0.2 | 1.0 | 0.05 | 0.30 | 88.4 | |

Having thus described the invention, it will be understood that such description has been given by way of illustration and example, and not by way of limitation. The appended claims define the scope of the invention.

What is claimed is:

1. In a method of recovering oil from a subterranean formation having injection means and production means completed therein in which a fluid is injected through said injection means and into said formation and oil is produced from said formation through said production means to the surface of the earth, the improvement comprising:
   (a) injecting through said injection means and into said formation a slug of flooding water
      (1) containing a quantity sufficient to convert said flooding water to a viscoelastic, shear hardening, positive nonsimple liquid, of a soap system of either:
         (i) an alkali metal soap of a fatty acid and a strong electrolyte;
         (ii) an ammonium soap of a fatty acid and an electrolyte, and
         (iii) a substituted ammonium soap of a fatty acid; said fatty acid containing from 12 to 18 carbon atoms, inclusive;
      (2) having a pH greater than 7.0; and
      (3) containing at least 0.001 percent by weight and no more than a saturation concentration of a stabilizing agent which is either an alcohol containing 5 to 13 carbon atoms, or an aromatic hydrocarbon, or both; and
   (b) injecting through said injection means and into said formation a driving fluid.

2. The method of claim 1 wherein said liquid has a pH between about 9 and about 12.

3. The method of claim 2 wherein said pH is about 10.5.

4. The method of claim 1 wherein said fatty acid is either lauric acid, myristic acid, palmitic acid, stearic acid, elaidic acid, or oleic acid.

5. The method of claim 1 wherein said soap system is an alkali metal soap of a fatty acid that contains from 12 to 18 carbon atoms, inclusive, and a strong electrolyte.

6. The method of claim 5 wherein said strong electrolyte is an inorganic salt containing an alkali metal cation.

7. The method of claim 6 wherein said strong electrolyte is sodium chloride.

8. The method of claim 6 wherein said inorganic salt containing an alkali metal cation is in a concentration of from about 0.4 to about 14.0 percent by weight of said flooding water.

9. The method of claim 5 wherein said alkali metal soap of a fatty acid is in a concentration of from about 0.001 to about 5.0 percent by weight of said flooding water.

10. The method of claim 9 wherein said alkali metal soap is in a concentration of from about 0.01 to about 1.0 percent by weight.

11. The method of claim 5 wherein said alkali metal soap of a fatty acid is either an alkali metal saturated soap of either alkali metal laurate, alkali metalamyristate, alkali metal palmitate, alkali metl stearate, or a mixture thereof.

12. The method of claim 5 wherein said alkali metal soap of a fatty acid is either an alkali metal unsaturated soap of either alkali metal elaidate, alkali metal oleate, or a mixture thereof.

13. The method of claim 12 wherein said alkali metal soap of a fatty acid is sodium oleate.

14. The method of claim 12 wherein said alkali metal unsaturated soap is present in a concentration of from about 0.05 to about 1.0 percent by weight of said flooding liquid.

15. The method of claim 5 wherein said alkali metal soap of a fatty acid is sodium oleate and said strong electrolyte is sodium chloride.

16. The method of claim 1 wherein said soap system is an ammonium soap of a fatty acid containing from 12 to 18 carbon atoms, inclusive, and an electrolyte.

17. The method of claim 16 wherein said electrolyte is either ammonia, derivative compounds of ammonia, or a mixture thereof.

18. The method of claim 17 wherein said electrolyte is present in a concentration of from about 0.05 to about 7.5 percent by weight of said flooding water.

19. The method of claim 16 wherein said ammonium soap of a fatty acid containing from 12 to 18 carbon atoms, inclusive, is in a concentration of from about 0.001 to about 5.0 percent by weight of said flooding water.

20. The method of claim 19 wherein said ammonium soap is present in a concentration of from about 0.01 to about 1.0 percent by weight of said flooding water.

21. The method of claim 16 wherein said ammonium soap of a fatty acid is ammonium oleate and said electrolyte either ammonium laurate, ammonium myristate, ammonium palmitate, ammonium stearate, or a mixture thereof.

22. The method of claim 16 wherein said ammonium soap of a fatty acid is an ammonium unsaturated soap of either ammonium elaidate, ammonium oleate, or a mixture thereof.

23. The method of claim 22 wherein said ammonium unsaturated soap is present in a concentration of from about 0.05 to about 1.0 percent by weight of said flooding liquid.

24. The method of claim 22 wherein said ammonium soap of a fatty acid is ammonium oleate.

25. The method of claim 16 wherein said ammonium soap of a fatty acid is ammonium oleate and said electrolyte is ammonium hydroxide and a minor amount of ammonium chloride.

26. The method of claim 1 wherein said soap system is a substituted ammonium soap of a fatty acid which contains 12 to 18 carbon atoms, inclusive.

27. The method of claim 26 wherein said substituted ammonium soap of a fatty acid is an amine soap of said fatty acid.

28. The method of claim 26 wherein said substituted ammonium soap of a fatty acid is an alkanolamine soap of said fatty acid.

29. The method of claim 26 wherein said substituted ammonium soap of a fatty acid is in a concentration of from about 0.001 to about 5 percent by weight of said viscoelastic solution.

30. The method of claim 29 wherein said substituted ammonium soap is in a concentration of from about 0.01 to about 1.0 percent by weight of said viscoelastic liquid.

31. The method of claim 26 wherein said substituted ammonium soap of a fatty acid is a substituted ammonium saturated soap of either substituted ammonium laurate, substituted ammonium myristate, substituted ammonium palmitate, substituted ammonium stearate, or a mixture thereof.

32. The method of claim 26 wherein said substituted ammonium soap of a fatty acid is a substituted ammonium unsaturated soap of either substituted ammonium elaidate, substituted ammonium oleate, or a mixture thereof.

33. The method of claim 26 wherein said substituted ammonium unsaturated soap is sec-butylamine oleate.

34. The method of claim 1 wherein said soap system is sec-butylamine oleate and said liquid has incorporated therein at least 0.05 percent by weight of ethylamine hydrochloride.

35. The method of claim 1 wherein said stabilizing agent is an alcohol containing from 5 to 13 carbon atoms, inclusive.

36. The method of claim 35 wherein said alcohol contains 6 to 9 carbon atoms.

37. The method of claim 36 wherein said alcohol contains 8 carbon atoms.

38. The method of claim 37 wherein said alcohol is 2-ethylhexanol.

39. The method of claim 1 wherein said stabilizing agent is an aromatic hydrocarbon.

40. The method of claim 39 wherein said aromatic hydrocarbon is either benzene, toluene, or xylene, or a mixture thereof.

41. The method of claim 40 wherein said aromatic hydrocarbon is benzene.

42. The method of claim 1 wherein said stabilizing agent is both an alcohol containing 5 to 13 carbon atoms and an aromatic hydrocarbon.

43. The method of claim 42 wherein said stabilizing agent is 2-ethylhexanol and benzene.

44. The method of claim 1 wherein said slug of flooding water of step (a) has a volume of from .1 to about 20 percent of pore volume of said formation.

45. The method of claim 44 wherein said slug of said flooding water has a volume of from about 1 to about 10 percent of the pore volume of said formation.

46. The method of claim 1 wherein said driving fluid is water.

47. The method of claim 1 wherein said driving fluid is natural gas.

48. The method of claim 1 wherein said slug of said flooding water is injected alternately with said slugs of at least equal volume of said driving fluid.

49. The method of claim 1 wherein a slug of from about 0.5 to 10 percent pore volume of either (a) stabilizing agent or (b) oil containing from 1 to 10 percent by weight of stabilizing agent is injected through said injection means and into said formation immediately in front of said slug of said flooding water of step (a).

50. The method of claim 49 wherein a slug of stabilizing agent is injected in a volume of 1.8 percent of said pore volume of said formation.

51. The method of claim 1 wherein fluid in said subterranean formation and said driving fluid contains relatively high concentrations of divalent ions, and precipitation of a divalent soap is prevented by injecting through said injection means and into said subterranean formation in front of and behind said slug of flooding water of step (a) a slug of liquid of either fresh water, a solution of chelating agent, or both.

References Cited

UNITED STATES PATENTS

| | | | |
|---|---|---|---|
| 3,198,252 | 8/1965 | Walker et al. | 166—32 |
| 3,279,537 | 10/1966 | Kirk et al. | 166—9 |
| 3,292,697 | 12/1966 | Abdo | 166—9 |
| 3,292,698 | 12/1966 | Savins | 166—9 |
| 3,303,879 | 2/1967 | Williams | 166—9 |

STEPHEN J. NOVOSAD, *Primary Examiner.*

UNITED STATES PATENT OFFICE

CERTIFICATE OF CORRECTION

Patent No. 3,410,343                                        November 12, 1968

Milton K. Abdo

It is certified that error appears in the above identified patent and that said Letters Patent are hereby corrected as shown below:

Column 1, line 26, "benezene" should read -- benzene --. Column 2, line 28, "nonunion" should read -- nonuniform --. Column 11, line 22, "stimulate" should read -- simulate --. Column 13, line 62, "metalamyristate" should read -- metal myristate --; line 63, "metl" should read -- metal --. Column 14, line 21, "ammonium oleate and said electro-" should read -- an ammonium saturated soap of --.

Signed and sealed this 10th day of March 1970.

(SEAL)
Attest:

Edward M. Fletcher, Jr.                                WILLIAM E. SCHUYLER, JR.
Attesting Officer                                               Commissioner of Patents